US008571532B2

(12) United States Patent
Sweeney et al.

(10) Patent No.: US 8,571,532 B2
(45) Date of Patent: Oct. 29, 2013

(54) SYSTEM AND METHOD FOR PROVIDING CELLULAR CALL GATING VIA A FEMTO CELL

(75) Inventors: Jeffrey Sweeney, Overland Park, KS (US); Kelsyn D. S. Rooks, Overland Park, KS (US); Jeffrey Stafford, Overland Park, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 739 days.

(21) Appl. No.: 12/403,060

(22) Filed: Mar. 12, 2009

(65) Prior Publication Data

US 2010/0234004 A1 Sep. 16, 2010

(51) Int. Cl.
*H04M 3/42* (2006.01)

(52) U.S. Cl.
USPC .......................................................... 455/415

(58) Field of Classification Search
USPC .......................................................... 455/415
See application file for complete search history.

(56) References Cited

U.S. PATENT DOCUMENTS

| 5,802,157 | A * | 9/1998 | Clarke et al. ................ 379/196 |
| 6,253,075 | B1 * | 6/2001 | Beghtol et al. ............. 455/415 |
| 6,721,059 | B1 * | 4/2004 | Sturgeon et al. ........... 358/1.15 |
| 6,941,131 | B2 * | 9/2005 | Roderique .................... 455/417 |
| 7,046,782 | B2 * | 5/2006 | Miller ...................... 379/207.14 |
| 7,221,950 | B2 * | 5/2007 | Frank et al. ................. 455/462 |
| 7,302,272 | B2 * | 11/2007 | Ackley ........................ 455/466 |
| 7,623,857 | B1 * | 11/2009 | O'Neil et al. .............. 455/426.1 |
| 2001/0044312 | A1 * | 11/2001 | Yamane ....................... 455/456 |
| 2004/0202307 | A1 * | 10/2004 | Schell et al. ............. 379/265.02 |
| 2006/0291641 | A1 * | 12/2006 | Barclay et al. ............ 379/211.03 |
| 2007/0254632 | A1 * | 11/2007 | Beadle et al. ............... 455/411 |
| 2007/0269026 | A1 * | 11/2007 | Moss et al. .................... 379/70 |
| 2008/0096518 | A1 * | 4/2008 | Mock et al. ................ 455/404.1 |
| 2009/0298470 | A1 * | 12/2009 | Huber et al. ................ 455/411 |
| 2010/0056184 | A1 * | 3/2010 | Vakil et al. ................ 455/456.5 |
| 2010/0135201 | A1 * | 6/2010 | Lewis et al. .................. 370/328 |
| 2010/0246795 | A1 * | 9/2010 | Saha et al. ............... 379/210.02 |

* cited by examiner

*Primary Examiner* — Jinsong Hu
*Assistant Examiner* — Magdi Elhag
(74) *Attorney, Agent, or Firm* — Patton Boggs LLP

(57) ABSTRACT

Embodiments of the disclosed invention include a system and method for providing cellular call gating. For example, in one embodiment, a femto cell is disclosed that includes a transceiver configured to send and receive signals associated with a registered cellular device; a processing unit configured to execute instructions to enable call gating function associated with the registered cellular device; a network interface configured to receive an incoming call to the registered cellular device; a caller identification module configured to identifying a caller ID associated with the incoming call; a data storage unit containing a list of allowed caller IDs associated with the registered cellular device; and a call gating module configured to route the incoming call to the registered cellular device if the caller ID associated with the incoming call is on the list of allowed caller IDs.

20 Claims, 4 Drawing Sheets

SYSTEM AND METHOD FOR PROVIDING CELLULAR CALL GATING VIA A FEMTO CELL

BACKGROUND OF THE INVENTION

The disclosed invention is related to the field of cellular communication devices and, in particular, to a femto cell. A femto cell is a small portable low power mobile phone base station that connects to a mobile operator's network using standard broadband DSL or Cable service for improving mobile coverage in areas with obstructed cellular signals, such as, the inside of a house or office building. In addition, femto cells may provide mobile phone coverage for both voice and data at a lower cost than that of a mobile operator's macro network.

SUMMARY

Embodiments of the disclosed invention include a system and method for providing cellular call gating. For example, in one embodiment, a femto cell is disclosed that includes a transceiver configured to send and receive signals associated with a registered cellular device; a processing unit configured to execute instructions to enable call gating functionality associated with the registered cellular device; a network interface configured to receive an incoming call to the registered cellular device; a caller identification module configured to identifying a caller ID associated with the incoming call; a data storage unit containing a list of allowed caller IDs associated with the registered cellular device; and a call gating module configured to route the incoming call to the registered cellular device if the caller ID associated with the incoming call is on the list of allowed caller IDs.

In accordance with another embodiment, a method for providing cellular call gating is disclosed that includes monitoring for a cellular signal associated with a registered cellular device within range of a femto cell. The method enables a call gating functionality associated with the registered cellular device in response to identifying the cellular signal associated with the registered cellular. The method furthers monitors for incoming calls to the registered cellular and identifies a caller ID associated with an incoming call. The method determines whether the caller ID is on a list of allowed caller IDs associated with the registered cellular device. The method routs the incoming call to the registered cellular device in response to the caller ID being on the list of allowed caller IDs associated with the registered cellular device.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION

The disclosed embodiments and advantages thereof are best understood by referring to FIGS. 1-4 of the drawings, like numerals being used for like and corresponding parts of the various drawings. Other features and advantages of the disclosed embodiments will be or will become apparent to one of ordinary skill in the art upon examination of the following figures and detailed description. It is intended that all such additional features and advantages be included within the scope of the disclosed embodiments, and protected by the accompanying drawings. Further, the illustrated figures are only exemplary and not intended to assert or imply any limitation with regard to the environment, architecture, or process in which different embodiments may be implemented.

Figure 1:
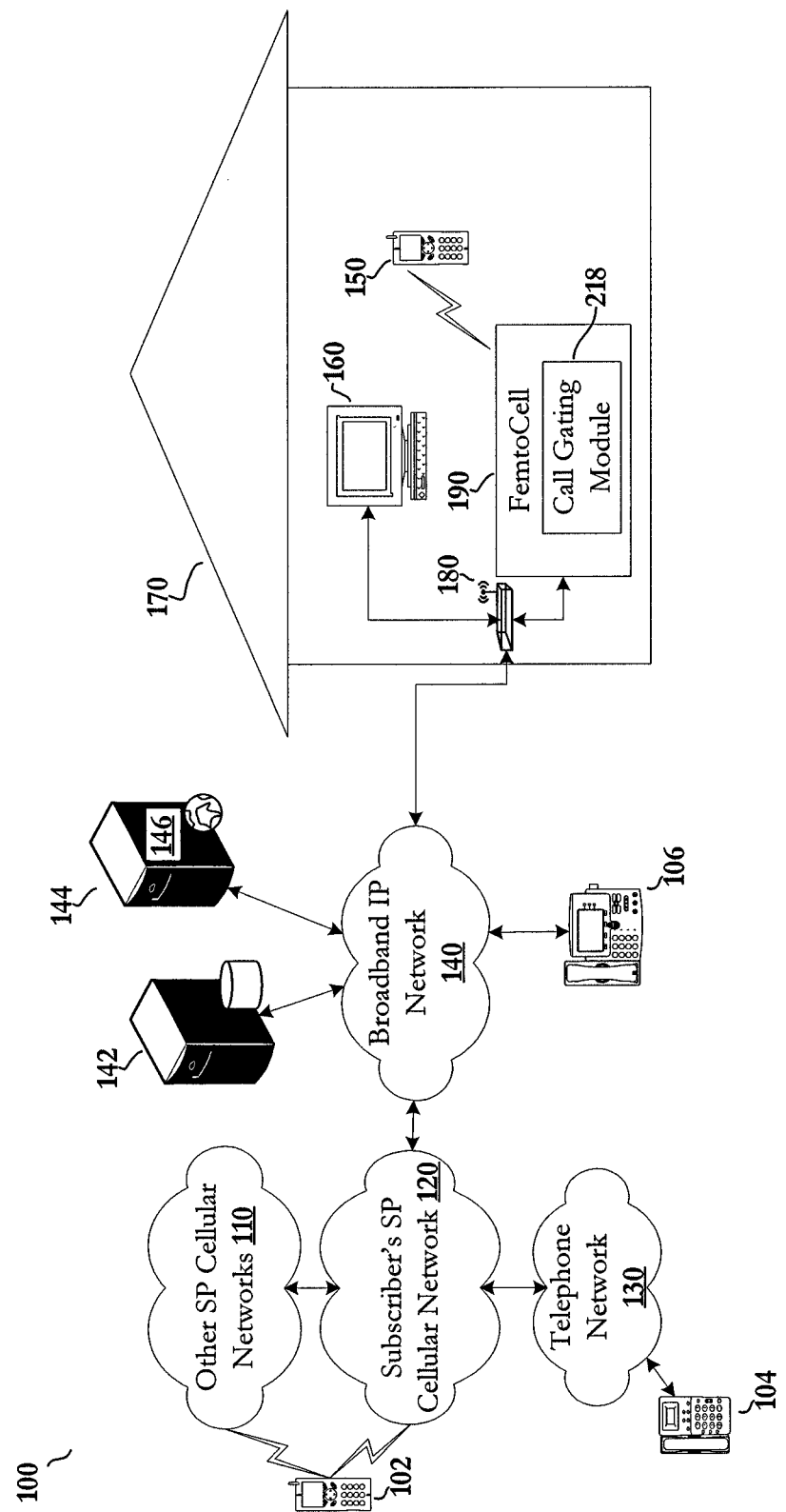
FIG. 1 depicts an embodiment a network environment in which the illustrative embodiments may be implemented for providing cellular call gating.

FIG. 1 depicts an embodiment a network environment 100 in which the illustrative embodiments may be implemented. In the depicted embodiment, a femto cell 190 is disclosed for providing cellular call gating functionality to one or more cellular devices. For example, in one embodiment, femto cell 190 may include a call gating module 218 for providing cellular call gating functionality to cellular device 150. Cellular device 150 may be any type of communication device that utilizes a cellular network for transmitting voice communication, such as, but not limited to, a cellular phone. Cellular call gating functionality, as referenced herein, is defined as providing access control functions for limiting calls to a cellular device. For example, in some embodiments, cellular call gating functionality may include routing an incoming call directly to voicemail, blocking delivery of a text message, and/or only routing preferred calls to the cellular device.

In accordance with the disclosed embodiments, femto cell 190 may be located in a building 170. Building 170 may be, but is not limited to, a residential home, a school building, and/or an office building. In one embodiment, femto cell 190 may utilize the radio spectrum licensed to a particular mobile service provider for providing cellular service to cellular device 150. For example, in one embodiment, when cellular device 150 is within signal range of femto cell 190, cellular device 150 will automatically detect femto cell 190's signal and switch over to use femto cell 190 instead of the outdoor cell sites (i.e., the macro cellular network). In one embodiment, cellular device 150 makes and receives calls in exactly the same way as before, except that the signals are routed through femto cell 190 to one of the mobile service provider main switching centers (MSC) via a broadband IP network 140. For instance, in one embodiment, femto cell 190 may communicate with a broadband router 180 for connecting femto cell 190 to broadband IP network 140. Broadband router 180 is a device that determines and routes data to the next network point toward its destination. In some embodiments, femto cell 190 may communicate wirelessly with broadband router 180. In other embodiments, femto cell 190 is physically coupled to broadband router 180 for providing data transfer. In some embodiments, one or more other devices may be communicatively coupled to broadband router 180 for enabling communication with broadband IP network 140, such as, but not limited to, a data processing system 160 located in building 170. Data processing system 160 may be, but is not limited to, a desktop computer, a laptop, or other types of mobile processing devices.

In one embodiment, broadband IP network 140 may include one or more data networks, such as, but not limited to, the Internet, for routing communications between one or more communication devices and/or data processing systems. The Internet is a global system of interconnected computer networks that interchange data using the standardized Internet Protocol Suite (TCP/IP). Additionally, broadband IP network 140 may include other types of data networks, such as, but not limited to, an intranet, a private local area network (LAN), a wide area network (WAN), and a wireless local area network (WLAN).

In one embodiment, data processing system 160 may communicate with a web and/or application server 144 hosting a webpage and/or web application 146 for enabling a user to configure the functionalities, such as, but not limited to, a call gating functionality, associated with femto cell 190. Alternatively, or in addition to, in some embodiments, data processing system 160 may directly communicate, wired or wirelessly, with femto cell 190 for enabling a user to configure the functionalities associated with femto cell 190. For example, in one embodiment, data processing system 160 may be physically connected to femto cell 190 via a universal serial bus (USB) cable for enabling a user using data processing system 160 to configure the functionalities of femto cell 190. For instance, in one embodiment, femto cell 190 may include built in software/hardware for detecting a connection with data processing system 160 and responsive to detecting a connection with data processing system 160, providing a user interface on data processing system 160 for configuring the functionalities of femto cell 190.

In the depicted embodiment, cellular device 150 may communicate with one or more communication devices via femto cell 190. For example, in one embodiment, a cellular device 102 associated with a different mobile service provider than that of cellular device 150 may place a call to cellular device 150. In this example, the call is routed from the other service provider cellular network 110 to the subscriber's service provider cellular network 120. A mobile switching center within subscriber's service provider cellular network 120 identifies that cellular device 150 is registered/communicating with femto cell 190 and routes the call to femto cell 190 via broadband IP network 140. As will be further described, in some embodiments, femto cell 190 may be configured to provide call gating functionalities with respect to cellular device 150, such as, but not limited to, determining whether to route the call to cellular device 150 or to route the call directly to voicemail. Additionally, in some embodiments, subscriber's service provider cellular network 120 and/or other service provider cellular network 110 may include one or more different types of mobile networks, such as, but not limited to, a Global System for Mobile Communications (GSM) network, a Code-Division Multiple Access (CDMA) network, an Enhanced Data GSM Environment (EDGE) network, and/or a 3 G/4 G network.

Similarly, in some embodiments, cellular device 150 may communicate with a landline analog phone 104. For instance, in one embodiment, landline analog phone 104 may place a call over telephone network 130 to cellular device 150. In some embodiments, telephone network 130 may include a public switched telephone network (PSTN). The public switched telephone network is the standard telephone network, consisting generally of copper wires for carrying analog voice data, utilized by most homes. In some embodiments, telephone network 130 may also include digital telephone networks, such as, but not limited to, an integrated services digital network (ISDN) and a fiber distributed data interface (FDDI) network. The call from landline analog phone 104 to cellular device 150 is routed from telephone network 130 to subscriber's service provider cellular network 120 and then routed to femto cell 190.

Further, in some embodiments, a broadband phone 106 may place a voice over IP call to cellular device 150. In these embodiments, the call is routed through broadband IP network 140 to subscriber's service provider cellular network 120. A MSC located within subscriber's service provider cellular network 120 locates cellular device 150. In one embodiment, if cellular device 150 is currently communicating/registered with femto cell 190, the MSC routes the call to femto cell 190 via broadband IP network 140. In accordance with the one of the disclosed embodiments, femto cell 190 may include a call gating functionality to determine whether to route the call to cellular device 150 or whether to route the call to a voicemail system associated with cellular device 150.

For instance, in one embodiment, cellular device 150 may be associated with a network voicemail system 142. Network voicemail system 142 may be a voicemail system for storing voicemails for a plurality of communication devices associated with the cellular service provider corresponding to cellular device 150. In one embodiment, a user utilizing cellular device 150 may call network voicemail system 142 to retrieve voicemail messages left for cellular device 150.

Figure 2:
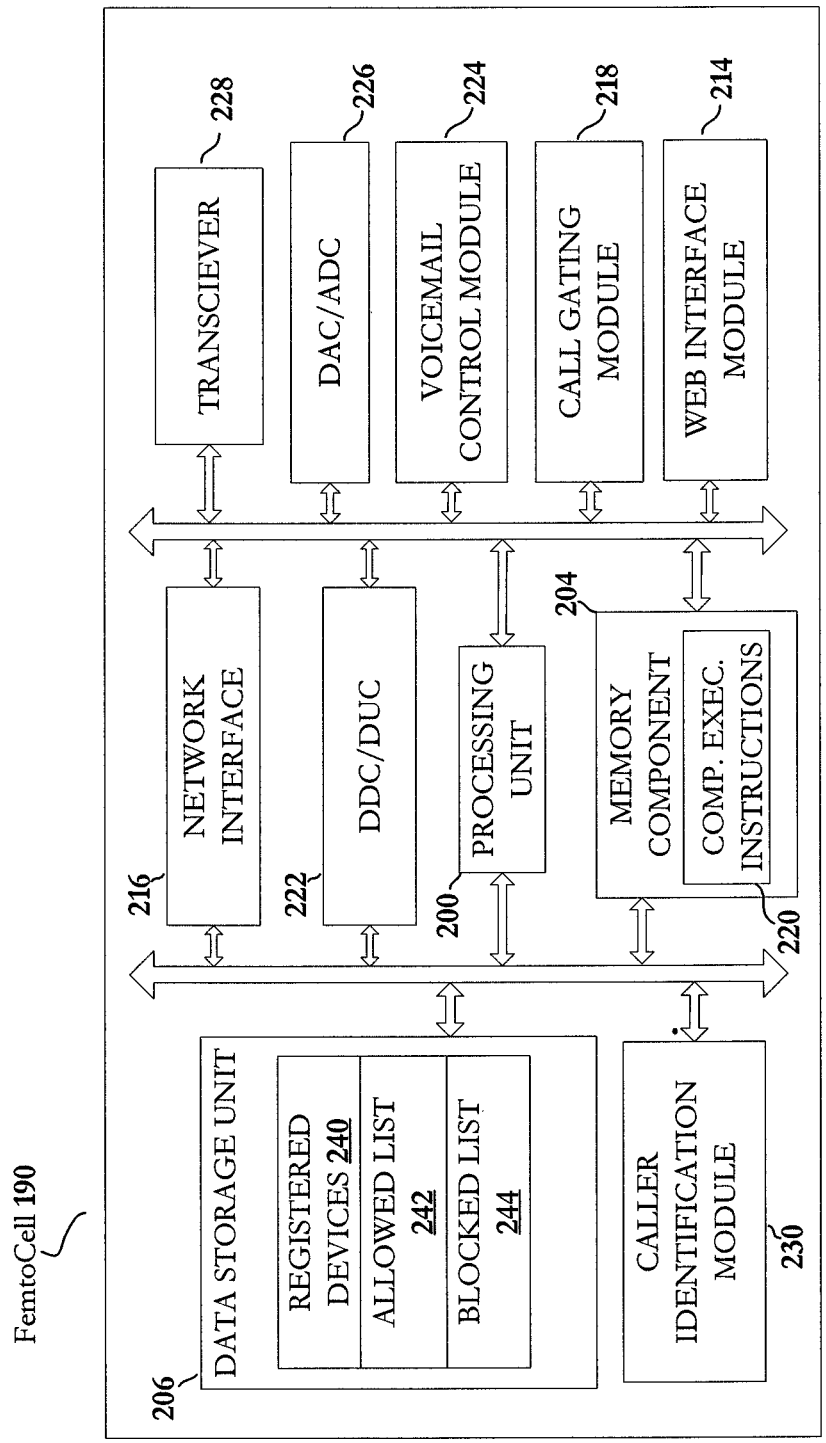
FIG. 2 depicts an embodiment of a femto cell for providing cellular call gating in accordance with the illustrative embodiments.

With reference now to FIG. 2, an embodiment of femto cell 190 for providing cellular call gating in accordance with the illustrative embodiments is presented. In the depicted embodiment, femto cell 190 includes, among other things, a processing unit 200, a memory component 204, and a data storage unit 206. Processing unit 200 may comprise of one or more microprocessors for executing computer usable program code/instructions for providing cellular call gating. For example, in one embodiment, processing unit 200 may be one or more digital signal processors (DSP). A DSP is a specialized microprocessor designed specifically for digital signal processing. For instance, in one embodiment, processing unit 200 may convert signals from analog to digital, manipulate the signals digitally, and then convert the signals back to analog form. In other embodiments, processing unit 200 may utilize a dedicated digital to analog converter/analog to digital converter (DAC/ADC) 226 for converting signals from analog to digital and vice versa.

In addition, in one embodiment, processing unit 200 may execute computer executable instructions 220 stored in memory component 204 for registering a cellular device for enabling the cellular device to send and receive calls via femto cell 190, monitoring for incoming calls to one or more registered cellular devices, and for routing incoming calls to a registered cellular device only if the caller ID associated with the incoming call is on a preferred/allowed list of caller IDs associated with the registered cellular device. Additionally, in some embodiments, processing unit 200 may execute computer executable instructions 220 stored in memory component 204 for enabling a caller associated with a caller ID not identified on a preferred/allowed list of caller IDs associated with a registered cellular device to self-identify the call as important or urgent for enabling femto cell 190 to route the call the registered cellular device.

In some embodiments, memory component 204 is a volatile memory component of femto cell 190. Volatile memory is memory that loses its contents when femto cell 190 loses power. For example, in some embodiments, memory component 204 may be random access memory (RAM). Random access memory stores currently executing instructions and/or data utilized by a software application and/or hardware device.

Data storage unit 206 is a non-volatile memory component of femto cell 190, such as, but not limited to, a hard disk drive. Non-volatile memory retains stored data when power is lost. In some embodiments, data storage unit 206 may be an external hard drive and/or a network data storage unit. In other embodiments, data storage unit 206 may be a removable data storage unit, such as, but not limited to, a flash card. In some embodiments, data storage unit 206 may include a data file of registered devices 240 containing data associated with one or more cellular device that may utilize femto cell 190 for sending and receiving calls. In addition, in some embodiments, data storage unit 206 may also store an allowed list 242. In one embodiment, allowed list 242 contains a plurality of preferred caller IDs respectively associated with the one or more registered cellular devices. For example, in some embodiments, femto cell 190 may include a call gating module 218 that may utilize allowed list 242 for determining whether to route an incoming call to a registered cellular device based on whether the caller ID associated with the incoming call is included in allowed list 242 of the called device.

Further, in some embodiments, data storage unit 206 may store a blocked list 244 containing a plurality of blocked caller IDs respectively associated with the one or more registered cellular devices. For instance, in some embodiments, in response to receiving an incoming call to a registered cellular device that is currently utilizing femto cell 190, call gating module 218 may automatically route all incoming calls having caller IDs included in blocked list 244 to network voicemail system 142. Additionally, in some embodiments, femto cell 190 may block delivery of a call having a caller ID included in blocked list 244 associated with a registered cellular device. For example, in some embodiments, femto cell 190 may respond with a busy signal for blocking voice calls or may block delivery of an SMS message.

Alternatively, or in addition, in some embodiments, femto cell 190 may include a voicemail control module 224. In one embodiment, voicemail control module 224 may enable a non-preferred caller (i.e., a caller having a caller ID that is not included on allowed list 242) to self-identify a call as urgent or important for bypassing the automatic voicemail routing feature of femto cell 190. In these embodiments, if a caller self-identifies the call as important/urgent, then voicemail control module 224 routes the call to the called device, else voicemail control module 224 routes the call to voicemail. In one embodiment, voicemail control module 224 may enable only callers having caller IDs not included in blocked list 244 associated with a registered cellular device to self-identify a call as urgent or important for bypassing the automatic voicemail routing feature of femto cell 190. In other embodiments, voicemail control module 224 may enable all callers including blocked callers to self identify a call as urgent and/or important for bypassing the voicemail routing feature of femto cell 190.

In addition, femto cell 190 may include a communication interface 216 for receiving signals and/or data from other network devices, such as, but not limited to, a telephone switch located at a central office or mobile switching center, a web and/or application server 144, and a network voicemail system. For example, in some embodiments, communication interfaces 216 may include an Ethernet port and/or a telephone line port for connecting femto cell 190 to broadband IP network 140 and/or to subscriber's cellular network 120 for sending and receiving calls. In addition, in accordance with the disclosed embodiments, communication interface 216 may receive caller ID information associated with an incoming call from subscriber's cellular network 120. For instance, in some embodiments, a telephone switch may send an analog data stream containing the caller ID information to the called party. In one embodiment, femto cell 190 may include a caller identification module 230 for interpreting the analog data stream to determine the caller ID associated with an incoming call. In some embodiments, the caller ID information may be in single data message format (SDMF) which provides the caller's telephone number and the date/time of the call. In other embodiments, the caller ID information may be in multiple data message format (MDMF) which, in addition to the information provided by SDMF format, can also provide the directory listed name for the particular number.

Additionally, in some embodiments, communication interface 216 may include one or more data/communication ports. For example, in one embodiment, communication interface 216 may include a USB port for enabling a user to directly connect a data processing system to femto cell 190 to configure the functionalities of femto cell 190.

In addition, in some embodiments, femto cell 190 may include a web interface module 214 for interfacing with a webpage/application for enabling a subscriber to configure femto cell 190. For example, in one embodiment, web interface module 214 may communicate with web and/or application server 144 hosting a webpage and/or web application 146 for enabling a user to configure the functionalities of femto cell 190, such as, but not limited to, a call gating function. Additionally, in some embodiments, web interface module 214 may interface with a network address book for importing a list of contacts associated with a subscriber of a registered cellular device. For example, in some embodiments, a user may import contact information from network or local address book for populating an allowed list 242 associated with a registered cellular device.

Additionally, femto cell 190 may include one or more transceivers, such as, but not limited to, transceiver 228 for sending and receiving signals between one or more cellular devices. In some embodiments, transceiver 228 may include mechanisms to control and minimize interference with the macro cellular system and/or interference between femto cell devices. In addition, in some embodiments, transceiver 228 may support concurrent operation on multiple radio technologies and multiple concurrent frequency assignments. Further, in accordance with some embodiments, transceiver 228 may support idle handoff between femto cell 190 and the macro cellular system.

In addition, in some embodiments, femto cell 190 may include a digital down/up converter (DDC/DUC) 222. In one embodiment, DDC/DUC 222 may perform digital-down-conversion on the receive path and digital-up-conversion on the transmit path, similar to the operations of a modem.

Figure 3:
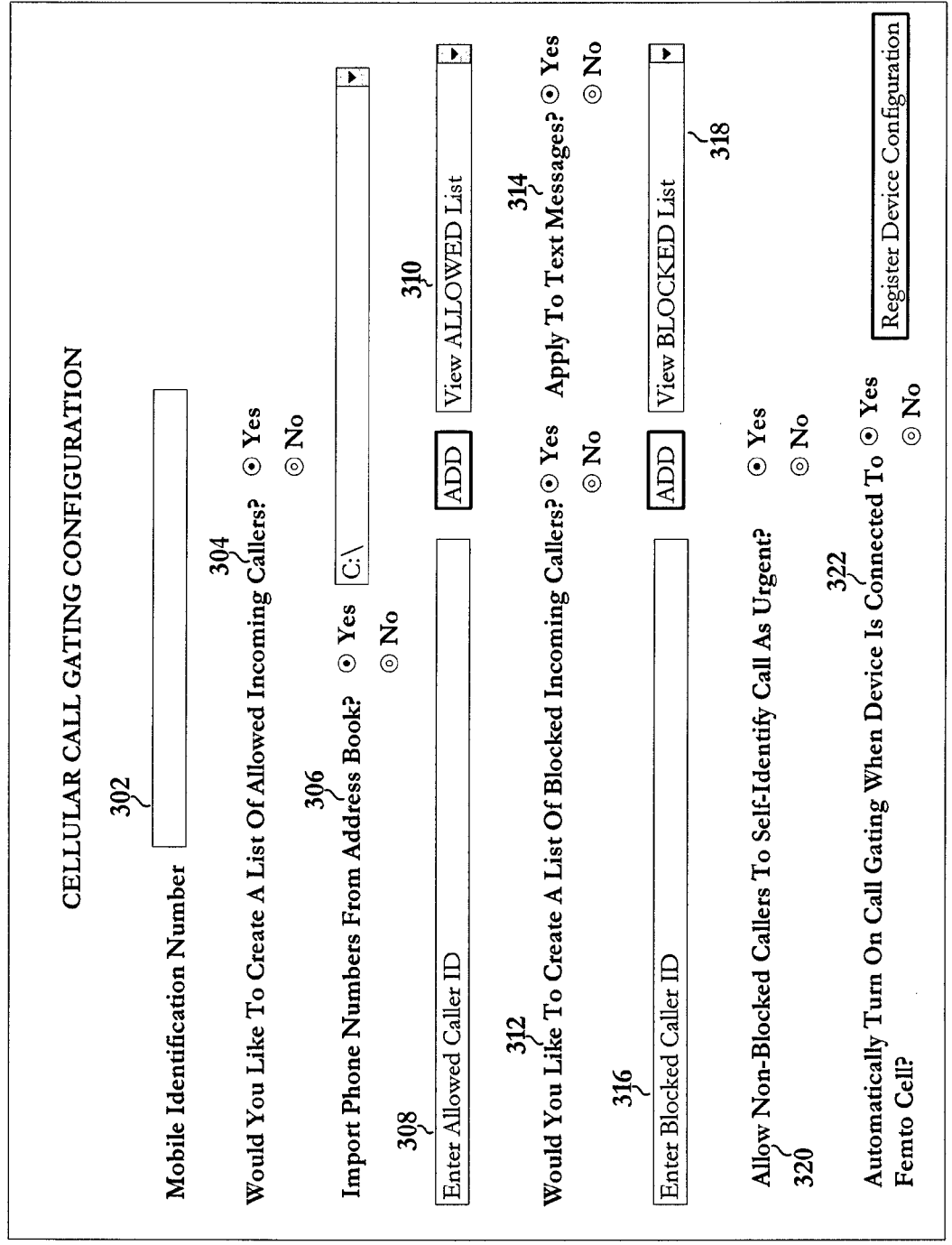
FIG. 3 depicts an embodiment of a user interface for configuring a femto cell to provide cellular call gating in accordance with an illustrative embodiment.

FIG. 3 depicts an embodiment of a user interface 300 for configuring a femto cell to provide cellular call gating in accordance with an illustrative embodiment. In one embodiment, user interface 300 may be generated by a web server hosting a webpage/portal for enabling a user to configure femto cell 190. Alternatively, or in addition to, in some embodiments, user interface 300 may be software/firmware locally installed on femto cell 190 that enables a user to directly connect and configure femto cell 190 using a data processing system.

In one embodiment, user interface 300 includes a mobile identification text box 302 for enabling a user to register the Mobile Identification Number (MIN) associated with a cellular device. In other embodiments, user interface 300 may enable registration of an International Mobile Equipment Identity (IMEI) number associated with a cellular device. An IMEI number is a unique number assigned to a mobile phone that cannot be changed unlike a Mobile Identification Number (MIN) of a cellular device. In one embodiment, femto cell 190 only allows registered cellular devices to connect to femto cell 190 for sending and receiving calls.

In accordance with the disclosed embodiments, user interface 300 provides a user-selectable option 304 for creating a list of allowed/preferred caller IDs. In one embodiment, the list of allowed/preferred caller IDs is utilized by femto cell 190 to screen incoming calls to a registered cellular device. For instance, in one embodiment, femto cell 190 may forward incoming calls to a registered cellular device only if the caller ID associated with the incoming call is included in the list of allowed/preferred caller IDs associated with the registered cellular device. In one embodiment, femto cell 190 may automatically include caller IDs associated with emergency numbers in the list of allowed/preferred caller IDs, e.g., calls from the police or fire department are automatically routed to a registered cellular device.

In addition, in some embodiments, user interface 300 may include an import option 306 for enabling a user to import a locally stored and/or a network address book for populating the list of allowed/preferred caller IDs. For example, in one embodiment, user interface 300 may enable a user to import caller ID information from a user's Microsoft Outlook® contact information. In some embodiments, a user may selectively import only desired caller IDs from an address book.

Additionally, in some embodiments, user interface 300 may include a manual entry option 308 that enables a user to manually enter an allowed caller ID. User interface 300 may also include a view allowed list option 310 for enabling a user to view and edit the list of allowed/preferred caller IDs associated with a registered cellular device. For instance, in some embodiments, view allowed list option 310 may provide a pull down menu containing a list of the allowed caller IDs. In other embodiments, view allowed list option 310 may present a separate window that enables a user to view and edit the list of allowed/preferred caller IDs associated with a registered cellular device.

In some embodiments, user interface 300 may include a user-selectable blocked list option 312 for enabling a user to create a list of blocked caller IDs. In one embodiment, femto cell 190 utilizes the list of blocked caller IDs associated with a registered cellular device to automatically route all incoming calls having caller IDs that are included on the list of blocked caller IDs to voicemail. In addition, in some embodiments, user interface 300 may include a user-selectable SMS option 314 for enabling a user to configure femto cell 190 to block delivery of text messages having caller IDs that are included on the list of blocked caller IDs.

Additionally, in some embodiments, user interface 300 may include a manual entry option 316 for enabling a user to manually enter a blocked telephone number. In some embodiments, manual entry option 316 may accept wildcards characters, such as, an "*" for indicating one or more numbers. For example, a user may block delivery of all text messages from "1-800-*", such as, unsolicited text messages from telemarketers or from "214-*" for blocking all calls having this area code. Similarly, user interface 300 may include a view blocked list option 318 for enabling a user to view and edit the list of blocked caller IDs associated with a registered cellular device.

In addition, in some embodiments, user interface 300 may include a user-selectable option 320 for enabling non-blocked callers to self identify a call as important or urgent. For example, in one embodiment, if an incoming call having a caller ID that is not on the list of blocked caller IDs and is also not on the list of allowed caller IDs, femto cell 190 may notify the caller that the subscriber associated with the called device has enable a call gating/screening function and desires not be disturbed for non-urgent matters. In these embodiments, femto cell 190 may ask the caller if the caller would like to identify the call as an urgent call and have the call forwarded to the called device. In some embodiments, the caller may respond verbally (e.g., yes or no) or utilize a touchtone key to respond to femto cell 190 (e.g., press #1 to go to the called device's voicemail system, press #2 to ring the called device, or press #3 to disconnect call). In accordance with one embodiment, if the caller does not identify the call as urgent within a specified period, femto cell 190 automatically routes the call to a voicemail system associated with the called device.

Further, in some embodiments, user interface 300 may include a user-selectable option 322 for enabling a user to configure femto cell 190 to automatically turn on call gating functions for a registered cellular device when the registered cellular device is within signal range and communicating with femto cell 190. In other embodiments, a user may manually activate and/or deactivate call gating for a particular registered cellular device. For example, in one embodiment, a user may send an activation command to femto cell 190, e.g., a call to *75 from a registered cellular device may notify femto cell 190 to turn on the call gating functions associated with the registered cellular device. Similarly, in some embodiments, a user may send a deactivation command to femto cell 190 for turning off the call gating functions associated with a registered cellular device.

Figure 4:
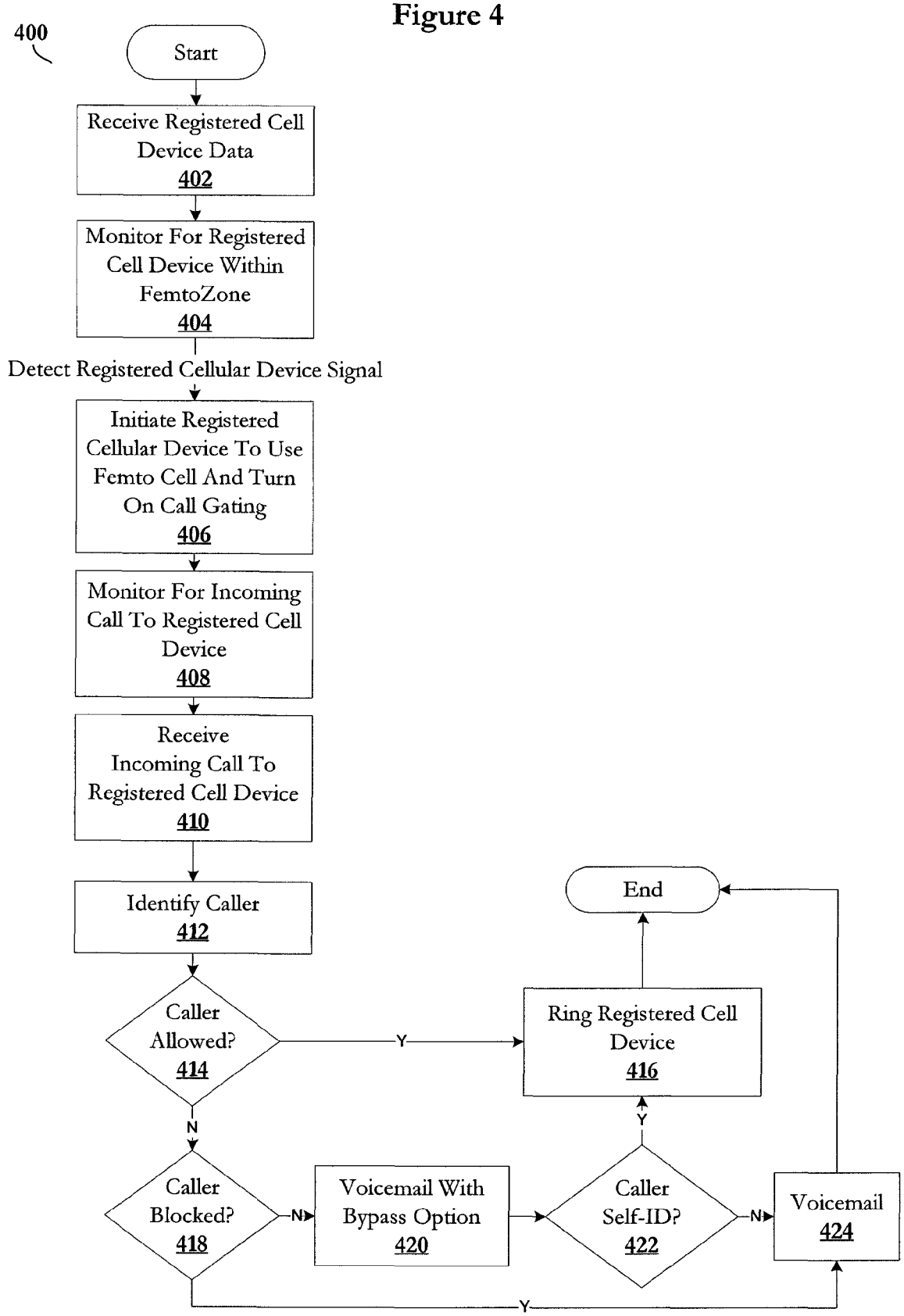
FIG. 4 depicts a flowchart illustrating an embodiment of a process for providing cellular call gating via a femto cell in accordance with the illustrative embodiments.

With reference now to FIG. 4, a flowchart depicting an embodiment of a process 400 for providing cellular call gating via a femto cell in accordance with an illustrative embodiment is presented. For example, in one embodiment, process 400 may be executed by femto cell 190 as for providing call gating to cellular device 150. Additionally, in some embodiments, process 400 may be executed to monitor one or more registered cellular devices simultaneously. In these embodiments, each registered cellular device may be configured differently and/or may have different allowed/blocked lists of caller IDs. In other embodiments, a plurality of cellular devices may have the same configurations and/or the same allowed/blocked list caller IDs. Thus, in these embodiments, a user only has to configure one femto cell instead of multiple cellular device.

In one embodiment, process 400 begins by receiving configuration data associated with a registered cellular device, such as, but not limited by, the configuration data referenced in reference FIG. 3. After receiving the configuration data, the process, at step 404, monitors for the cellular signal associated with the registered cellular device. In response to detecting the cellular signal associated with the registered cellular device, the process, at step 406, initiates communication with the registered cellular device (i.e., switches the communication channel of the registered cellular device to utilize the femto cell instead of the macro cell network) and turns on the call gating functions for the registered cellular device.

The process, at step 408, monitors for incoming calls to the registered cellular device. At step 410, the process receives an incoming call to the registered cellular device. In response to receiving the incoming call, the process, at step 412, identifies the caller ID associated with the incoming call. At step 414, the process determines whether the caller ID is included on a list of allowed caller IDs associated with the registered cellular device. In one embodiment, in response to a determination that the caller ID associated with the incoming call is on the list of allowed caller IDs associated with the registered cellular device, the process, at step 416, forwards the call to the registered cellular device, with process 400 terminating thereafter.

However, if the process determines that the caller ID associated with the incoming call is not on the list of allowed caller IDs, the process, at step 418, determines whether the caller ID associated with the incoming call is on a list of blocked caller IDs associated with the registered cellular device. In one embodiment, if the process determines that the caller ID associated with the incoming call is on the list of blocked caller IDs, the process, at step 414, automatically forwards the call to a voicemail system associated with the registered cellular device, with process 400 terminating thereafter.

In some embodiments, if the process determines that the caller ID associated with the incoming call is not on the list of allowed caller IDs and also not on the list blocked caller IDs associated with the registered cellular device, the process, at step 420, may present the caller with an option for self-identifying the call as an important or urgent call. At step 422, the process determines whether the caller has identified the call as an important call. If the process determines that the caller has identified the call as an important call, the process forwards the call to the registered cellular device and rings the called device at step 416, with process 400 terminating thereafter. However, if the process determines that the caller has not identified the call as an important call, the process forwards the call to a voicemail system associated with the registered cellular device, with process 400 terminating thereafter.

In some embodiments, if the process is unable determine a caller ID at step 412 (e.g., a blocked caller ID), the process would automatically direct a call to a voicemail system associated with the registered cellular device. In one embodiment, the process may enable a caller with a blocked caller ID to self identify the call as an important call and have the call directly to the registered cellular device. In other embodiments, a user may elect to have the process direct all callers with block caller IDs to voicemail with no bypass option available.

Further, in some embodiments, the disclosed embodiments for providing the call gating functions for a cellular device may include a timing feature associated with the call gating functions including, but not limited to, providing a time of day and/or day of the week feature associated with providing the call gating features. For example, in one embodiment, a user may select to engage the call gating features associated with a particular cellular device only after a certain time of the day, e.g., after 8 PM, or only on a particular day(s) of the week, such as, but not limited to, Saturday and Sunday. Further, in some embodiments, the timing features may enable a gradual reduction of incoming calls. For example, in one embodiment, the call gating features may enable a first set of callers to call after 5 PM, a subset of the first set of callers to call after 8 PM, and a third subset of the first set of callers to call after 10 PM.

Accordingly, the disclosed embodiments present a system and method for providing a user friendly and customizable way for providing cellular call gating. The disclosed embodiments present several advantages associated with providing call gating to cellular devices via a femto cell including, but not limited to, enabling a user to easily modify and customize a local device associated with the user instead of modifying a network resource that is associated with a service provider. Further, because the user is utilizing a femto cell instead of a network resource, in some embodiments, the user is able to avoid paying an additional service fee for the call gating features.

As will be appreciated by one skilled in the art, certain aspects of the disclosed embodiments may be embodied as an apparatus, method, or computer program product. In addition, the disclosed embodiments including, but not limited to, the disclosed modules may be implemented entirely with hardware or as a software embodiment (including firmware, resident software, micro-code, etc.) or an embodiment combining software and hardware aspects. Furthermore, the disclosed embodiments may take the form of a computer program product embodied in any tangible medium of expression having computer-usable program code embodied in the medium.

Computer program code for carrying out operations of the present invention may be written in any combination of one or more programming languages, including an object oriented programming language, such as Java, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The disclosed embodiments are described above with reference to flowchart illustrations, sequence diagrams, and/or block diagrams. Each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The terminology used herein is for describing particular embodiments only and is not intended to be limiting of the invention. As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described to explain the principles of the invention and the practical application, and to enable others of ordinary skill in the art to understand the invention for various embodiments with various modifications as are suited to the particular use contemplated.

In addition, the flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which may include one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The previous detailed description is of a small number of embodiments for implementing the invention and is not intended to be limiting in scope. One of skill in this art will immediately envisage the methods and variations used to implement this invention in other areas than those described in detail. The following claims set forth a number of the embodiments of the invention disclosed with greater particularity.

We claim:

1. A method performed by a femto cell for providing cellular call gating, the method comprising:
   monitoring for a cellular signal associated with a registered cellular device within range of the femto cell;
   determining whether to automatically activate a call gating function associated with the registered cellular device;
   responsive to a determination that the call gating function associated with the registered cellular device is to be automatically activated in response to the femto cell identifying the cellular signal associated with the registered cellular device, enabling the call gating function associated with the registered cellular device;
   responsive to a determination that the call gating function associated with the registered cellular device is to not automatically activated in response to the femto cell identifying the cellular signal associated with the registered cellular device, monitoring for an activation signal from the registered cellular device;
   responsive to receiving the activation signal from cellular device, enabling the call gating function associated with the registered cellular device;
   responsive to enabling the call gating function associated with the registered cellular device, monitoring for an incoming call to the registered cellular device;
   responsive to receiving an incoming call to the registered cellular device, identifying a caller ID associated with the incoming call;
   determining whether the caller ID is on a list of allowed caller IDs associated with the registered cellular device; and
   responsive to the caller ID being on the list of allowed caller IDs associated with the registered cellular device, routing the incoming call to the registered cellular device.

2. The method of claim 1, wherein the call gating function includes timing features for enabling a user to specify times and days in which the call gating function is enabled for the registered cellular device.

3. The method of claim 1, wherein the call gating function includes timing features for gradually reducing a number of allowed incoming calls based on time of day.

4. The method of claim 3, wherein the list of allowed caller IDs generated by importing data from an address book associated with a subscriber.

5. The method of claim 1, further comprising receiving the list of allowed caller IDs from a user utilizing a data processing system physically coupled to the femto cell.

6. The method of claim 1, further comprising disabling the call gating function associated with the registered cellular device in response to receiving a disabling request from the registered cellular device.

7. The method of claim 1, further comprising:
   monitoring for a cellular signal associated with a second registered cellular device within range of a femto cell;
   responsive to identifying the cellular signal associated with the second registered cellular device, enabling a call gating function associated with the second registered cellular device;
   monitoring for an incoming call to the second registered cellular device;
   responsive to receiving an incoming call to the second registered cellular device;
   identifying a caller ID associated with the incoming call to the second registered cellular device;
   determining whether the caller ID associated with the incoming call to the second registered cellular device is on a list of allowed caller IDs associated with the second registered cellular device; and
   responsive to the caller ID being on the list of allowed caller IDs associated with the second registered cellular device, routing the incoming call to the second registered cellular device.

8. The method of claim 7, further comprising disabling the call gating function associated with the registered cellular device in response to receiving a disabling request from the registered cellular device while maintaining the call gating function associated with the second registered cellular device.

9. The method of claim 1, further comprising:
   determining whether the caller ID is on a list of blocked caller IDs associated with the registered cellular device; and
   responsive to the caller ID being on the list of blocked caller IDs associated with the registered cellular device, routing the incoming call to a voicemail system associated with the registered cellular device.

10. The method of claim 9, further comprising:
    providing an option for a caller associated with the incoming call to identify the incoming call as an important call in response to the caller ID not being on the list of allowed caller IDs and not being on the list of blocked caller IDs associated with the registered cellular device; and responsive to receiving an indication from the caller that the call is important, routing the incoming call the registered cellular device.

11. The method of claim 1, wherein the call gating function includes text message blocking and wherein the method further comprises:
   monitoring for an incoming text message to the registered cellular;
   responsive to receiving an incoming text message to the registered cellular device;
      identifying a caller ID associated with the incoming text message;
   determining whether the caller ID associated with the incoming text message is on a list of blocked caller IDs associated with the registered cellular device;
   responsive to the caller ID associated with the incoming text message being on the list of blocked caller IDs associated with the registered cellular device, blocking delivery of the incoming text message; and
   responsive to the caller ID associated with the incoming text message not being on the list of blocked caller IDs associated with the registered cellular device, routing the incoming text message to the registered cellular device.

12. A femto cell for providing cellular call gating, the femto cell comprising:
   a transceiver configured to send and receive signals associated with a registered cellular device within range of the femto cell;
   a processing unit configured to execute instructions to monitor for a cellular signal associated with the registered cellular device within range of a femto cell and to:
      determine whether to automatically activate a call gating function associated with the registered cellular device in response to the femto cell identifying the signals associated with the registered cellular device and enable the call gating function associated with the registered cellular device in response to a determination that the call gating function associated with the registered cellular device is to be automatically activated;
      monitor for an activation signal from the registered cellular device in response to a determination that the call gating function associated with the registered cellular device is to not automatically activated in response to the femto cell identifying the cellular signal associated with the registered cellular device;
      enable the call gating function associated with the registered cellular device in response to receiving the activation signal from cellular device; and
      responsive to enabling the call gating function associated with the registered cellular device, monitor for an incoming call to the registered cellular device;
   a network interface configured to receive an incoming call to the registered cellular device;
   a caller identification module configured to identifying a caller ID associated with the incoming call;
   a data storage unit containing a list of allowed caller IDs associated with the registered cellular device; and
   a call gating module configured to determine whether the caller ID associated with the incoming call is on the list of allowed caller IDs associated with the registered cellular device and responsive to the caller ID being on the list of allowed caller IDs associated with the registered cellular device, routing the incoming call to the registered cellular device.

13. The femto cell of claim 12, wherein the data storage unit further contains a list of blocked caller IDs associated with the registered cellular device, and wherein the call gating module is configured to determine whether the caller ID associated with the incoming call is on the list of blocked caller IDs associated with the registered cellular device and responsive to the caller ID being on the list of blocked caller IDs associated with the registered cellular device, routing the incoming call to a voicemail system associated with the registered cellular device.

14. The femto cell of claim 12, wherein the processing unit is configured to execute instructions to disable the call gating function associated with the registered cellular device in response to receiving a disabling request from the registered cellular device.

15. The femto cell of claim 12, wherein the network interface is configured to receive the list of allowed caller IDs from a Web server hosting a webpage, wherein a subscriber associated with the registered cellular device utilizes the webpage for generating the list of allowed caller IDs.

16. The femto cell of claim 12, wherein the call gating module is configured to provide an option for a caller associated with the incoming call to identify the incoming call as an important call in response to a caller ID not being on the list of allowed caller IDs and not being on a list of blocked caller IDs associated with the registered cellular device.

17. The femto cell of claim 16, wherein the call gating module is configured to route the incoming call to the registered cellular device in response to receiving input from the caller identifying the incoming call.

18. The femto cell of claim 16, wherein the call gating module is configured to route the incoming call to a voicemail system associated with the registered cellular device in response not receiving input from the caller identifying the incoming call as an important call.

19. The femto cell of claim 12, further comprising:
   the network interface configured to receive an incoming text message to the registered cellular device;
   the caller identification module configured to identifying a caller ID associated with the incoming text message;
   the data storage unit further containing a list of blocked caller IDs associated with the registered cellular device; and
   the call gating module is configured to determine whether the caller ID associated with the incoming text message is on the list of blocked caller IDs associated with the registered cellular device and responsive to the caller ID associated with the incoming text message being on the list of blocked caller IDs, blocking delivery of the incoming text message.

20. A computer program product comprising a non-transitory tangible computer usable medium having a computer readable program code embodied therein, said computer readable program code adapted to be executed by a femto cell to:
   monitor for a cellular signal associated with a registered cellular device within range of the femto cell;
   determine whether to automatically activate a call gating function associated with the registered cellular device in response to the femto cell identifying the signals associated with the registered cellular device;
   responsive to a determination that the call gating function associated with the registered cellular device is to be automatically activated in response to the femto cell identifying the cellular signal associated with the registered cellular device, enable the call gating function associated with the registered cellular device;

responsive to a determination that the call gating function associated with the registered cellular device is to not automatically activated in response to the femto cell identifying the cellular signal associated with the registered cellular device, monitor for an activation signal from the registered cellular device;

responsive to receiving the activation signal from cellular device, enabling the call gating function associated with the registered cellular device;

responsive to enabling the call gating function associated with the registered cellular device, monitor for an incoming call to the registered cellular;

responsive to receiving an incoming call to the registered cellular device, identify a caller ID associated with the incoming call;

determine whether the caller ID is on a list of allowed caller IDs associated with the registered cellular device; and route the incoming call to the registered cellular device in response to the caller ID being on the list of allowed caller IDs associated with the registered cellular device.

* * * * *